Sept. 18, 1923.  
W. F. HEROLD  
CASTER BRACKET  
Filed Aug. 7, 1922  
1,468,293  
2 Sheets-Sheet 1
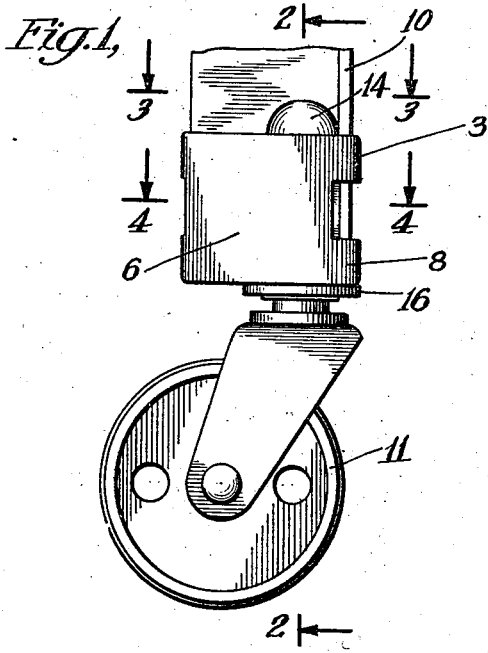
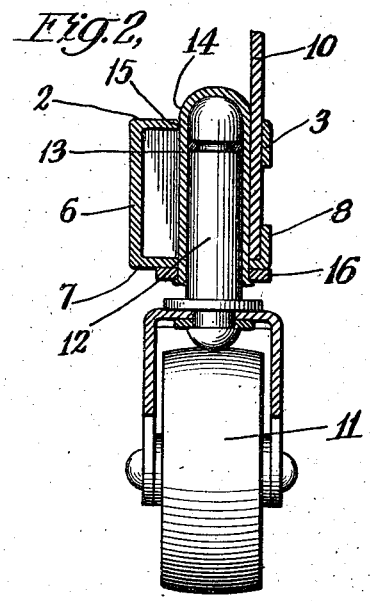
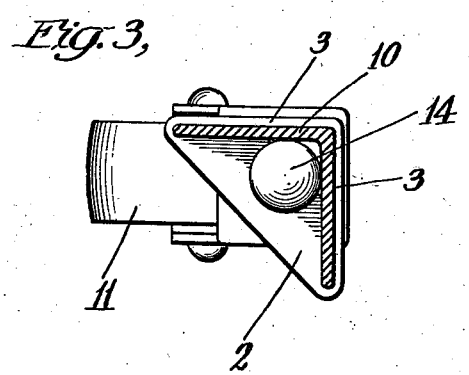
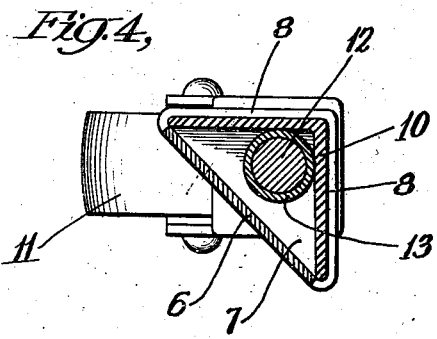
Inventor  
Walter F. Herold  
By his Attorneys  
Ward Crosby & Smith Sept. 18, 1923.
W. F. HEROLD
CASTER BRACKET
Filed Aug. 7, 1922
1,468,293
2 Sheets-Sheet 2
Fig. 5,
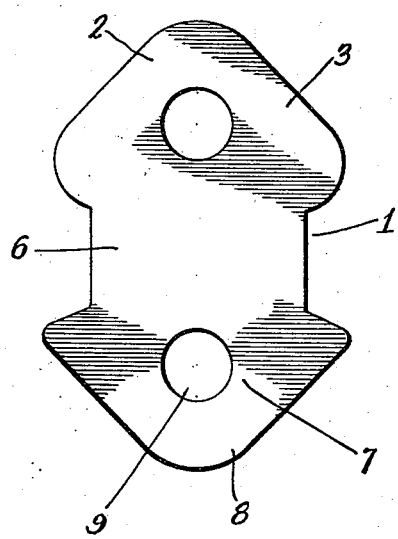
Fig. 6,
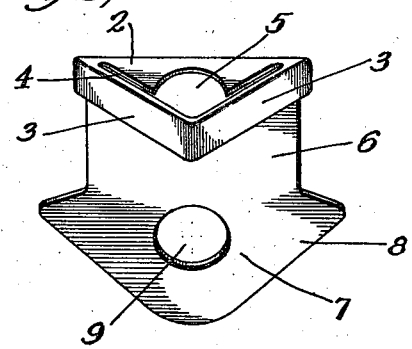
Fig. 7,
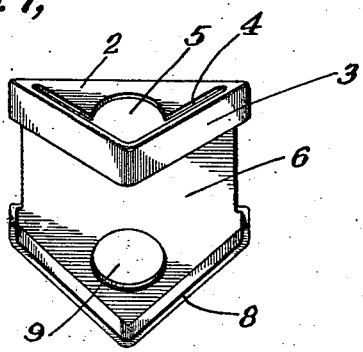
Fig. 8.
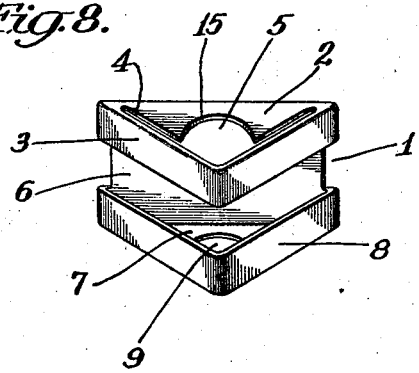
Inventor
Walter F. Herold
By his Attorneys
Ward Crosby & Smith Patented Sept. 18, 1923.

1,468,293

UNITED STATES PATENT OFFICE.

WALTER F. HEROLD, OF NEWARK, NEW JERSEY, ASSIGNOR TO THE BASSICK COMPANY, OF BRIDGEPORT, CONNECTICUT, A CORPORATION OF CONNECTICUT.

CASTER BRACKET.

Application filed August 7, 1922. Serial No. 579,980.

*To all whom it may concern:*

Be it known that I, WALTER F. HEROLD, a citizen of the United States, and resident of Newark, in the county of Essex and State of New Jersey, have invented certain new and useful Improvements in Caster Brackets, of which the following is a specification.

My invention relates to caster brackets, and particularly to caster brackets which are adapted to support furniture or other objects having angle iron or similar flanged legs or portions to which a caster is to be applied. The term "caster bracket" is used here broadly to include a bracket for furniture slides and the like supporting members, and the word "caster" is likewise used broadly to include furniture slides and the like supporting members.

One object of the present invention is the provision of a simple and effective caster bracket of the character referred to, and another object of the invention is the provision of a caster bracket which may be readily attached to and detached from the supporting or angle iron like leg, and which is rugged and staunch in construction.

In accordance with the present preferred embodiment of the invention as herein shown, a bracket is provided in which the lower end of the angle iron or similar flanged leg is detachably received, and an element of the caster member, such for example as a caster pintle socket, is inserted within the receiving member between a portion thereof and a surface of the angle iron, in such manner that the bracket, the angle iron leg and the caster member are bound or wedged together.

The caster bracket in its preferred embodiment is made of sheet metal.

The invention consists in the novel features, arrangement, construction and combinations of parts hereinafter described according to the preferred embodiment thereof, and the invention will be more particularly pointed out in the accompanying claims.

Other objects and advantages of the invention will more fully appear from the following description of the preferred embodiment of the invention, taken in connection with the accompanying drawings illustrating the same.

Referring to the drawings—

Fig. 1 is an elevation of a caster bracket embodying my invention and securing a caster to an angle iron leg;

Fig. 2 is a sectional view of the same taken on line 2—2 of Fig. 1;

Figs. 3 and 4 are, respectively, cross sectional views of the same taken on lines 3—3 and 4—4 of Fig. 1;

Fig. 5 shows a blank from which the caster bracket is bent up or drawn; and

Figs. 6, 7 and 8 show the blank in progressive steps of formation.

I will first describe, with reference to Figs. 1 to 4, inclusive, and 8, the completed caster bracket, and I will then describe, with reference to Figs. 5 to 7, inclusive, the manner in which the bracket shown in the drawings is made.

Referring to Fig. 8,—1 is the caster bracket which, according to this embodiment, is of general triangular form and comprises a top horizontal member or wall 2 having a vertically depending flange 3 extending along its angular front edge, said member being provided immediately adjacent said flange with an opening 4 of substantially angle iron form, said opening having at its apex an enlargement 5 for receiving the upper end of a caster pintle socket hereinafter described. The upper member 2 is connected by an intermediate upright member 6 to a bottom member 7 having vertical flanges 8 extending upwardly from the outer angular edge of said member, and preferably lying substantially in alignment with the corresponding upper flanges 3, so that said flanges 3 and 8 may be regarded in a sense as a plurality of angular strips or bands. The bottom member is provided with an opening 9 preferably circular in form and lying substantially in alignment with the enlargement 5 of the upper opening 4, and in proximity to the base of the flanges 8.

The opening 4 in the upper member is adapted to receive the lower end of an angle iron leg 10 (see Figs. 1 to 4, inclusive), which is slipped from the top through said opening down onto the lower member 7 which supports it. The angle iron leg when thus in place, lies against the vertical flanges 3 and 8, and it is intended to be bound or wedged against said surfaces in a manner now to be described.

The caster or other furniture-supporting element 11 is provided with a suitable element, such for example as a pintle 12 held in a pintle socket 13 having a tapering or rounded portion at its upper end such for example as the rounded head 14. The head of the pintle socket is inserted through the opening 9 in the lower member of the bracket through which it has a sliding fit, and thence up into the enlargement 5 of the opening 4 in the top member 2, the tapering or rounded upper surface 14 of the socket engaging the wall 15 of the opening so that as the socket is pressed further up into the opening, the wedging action of the tapering surface 14 against the wall 15 will force the socket against both inner surfaces of the angle iron and press it tightly against the flanges 3 and 8, thus binding the bracket, the angle iron leg and the pintle socket tightly together. The size and location of the openings 5 and 9 with regard to the angular flanges 3 and 8 and the tapering form of the socket pintle, are such as to permit the use of angle iron legs of varying thicknesses and yet insure a secure binding action when the socket is pressed up into the upper opening, all as will be readily understood from this description in connection with the drawings. The socket pintle may be provided with a lower horizontal flange or collar 16 to limit its upward movement by abutting the lower wall of the bottom member 7.

It will appear from the foregoing that the caster with its pintle, the pintle socket (where a socket is used on the pintle), and the triangular shaped bracket proper are assembled together on the angle iron leg by merely inserting the pintle socket through the bottom hole and forcing its tapered edge into the upper hole to wedge the parts together, and then inserting the pintle; and that since the angle iron leg rests upon the bottom member of the bracket, the weight of the furniture being supported will tend to press the bracket further over the tapered upper portion of the pintle socket and thus tend to more tightly wedge the parts and bind them together. If it is desired to disassemble the parts it is only necessary to strike a blow on the upper end of the pintle socket, whereupon it will be driven out of the opening and the parts will be detached.

Referring now to the preferred method, as illustrated, of forming the bracket member proper, reference is to be had to Figs. 5 to 8, inclusive.

Referring to Fig. 5, 1 is the blank from which the bracket proper is formed. This blank, if the device is made of sheet metal, is punched or stamped out of a fairly thick piece of metal with the circular holes 5 and 9 punched therein. The blank thus punched consists of an upper tapered or arrow-head like portion 2, and a lower tapered or arrow-head like portion 7. By means of a properly shaped die and an angular shaped punch, in one operation the upper tapered portion 2 is bent over or drawn laterally with respect to the intermediate upright portion 6, and the flanges 3 are bent or drawn vertically from the metal along the edges of the tapered portion 2. The opening 4—5, is then punched in the bent over member right at the base of the flange 3, so that the base of the inner wall of the flange 3 constitutes a wall of said opening (see Fig. 6). When this has been accomplished, the next step is to bend or draw up the flanges 8 along the edges of the tapered lower member 7 (see Fig. 7), and then draw over or bend the lower member 7 laterally with respect to the intermediate upright portion 6 or parallel with the top member 2 (see Fig. 8).

While I have described my invention in detail in connection with the preferred embodiment of the same as shown in the drawings, it will be understood by those skilled in the art, after understanding the invention, that various changes and modifications may be made therein without departing from the spirit or scope of the invention, and I do not wish to be understood as limiting myself other than as indicated in the appended claims.

Having thus described my invention, what I claim as new and desire to secure Letters Patent, is:

1. In a caster bracket adapted to receive the lower end of an angle iron leg, the combination of a top member with an angular opening therethrough, through which said leg may be inserted, a bottom member for supporting the leg, and a vertical member connecting said top and bottom members, and separate removable means for securing the bracket to the angle iron leg.

2. In a caster bracket adapted to receive the lower end of an angle iron leg, the combination of a top member with an angular opening therethrough, through which said leg may be inserted, a bottom member for supporting the leg, and a vertical member connecting said top and bottom members, said bottom member having an opening which in vertical alignment is near the apex of the angular opening in said top member, and a separable member adapted to be inserted through said opening in the bottom member and into the opening in the top member to engage a wall of said latter opening, to thereby force said separable member against the angle iron leg to force the latter against the outer wall of said angular opening.

3. A caster bracket comprising an integral construction consisting of substantially triangular top and bottom members and an upright member joining the hypothenuses of the same, and angularly disposed strips paralleling the other two sides of each of said top and bottom members, and against which an angle iron leg is adapted to fit, said top member having an angular opening for receiving the angle iron leg and the bottom member being adapted to support said leg, and removable means for removably securing the bracket to the leg.

4. A caster bracket comprising an integral construction consisting of substantially triangular top and bottom members and an upright member joining the hypothenuses of the same, and angularly disposed strips paralleling the other two sides of each of said top and bottom members, and against which an angle iron leg is adapted to fit, said top member having an angular opening for receiving the angle iron leg and the bottom member being adapted to support said leg, and tapered means adapted to be inserted through said opening in the top member to engage a wall thereof to thereby force the angle iron leg against said angularly disposed strips of said top member.

5. In a caster bracket adapted to receive the lower end of an angle iron leg, the combination of a top member having an angular opening therethrough adapted to receive said leg, a bottom member adapted to support said leg, and having an opening therein, and caster securing means adapted to be inserted through said opening in the lower member and into the opening in the upper member between a portion of said member and the angle iron leg to wedge the latter against the wall of said angular opening.

6. In a caster bracket adapted to receive the lower end of an angle iron leg, the combination of a top member with an angular opening therethrough for receiving the leg, and a bottom member for supporting the leg, and a vertical member connecting said top and bottom members, said top and bottom members each having angularly disposed vertical flanges against which the outer surfaces of the angle iron leg are adapted to fit, said top and bottom angularly disposed flanges being separated from each other and said bracket having provision for receiving and securing a caster thereto.

7. In a caster bracket adapted to receive the lower end of an angle iron leg, the combination of substantially triangular shaped top and bottom members, the hypothenuse of each member being joined by an upright member, and vertical angularly disposed strips paralleling the other two sides of each of said top and bottom members and against which the angle iron leg is adapted to fit, said top member having an angular opening for receiving the angle iron leg, and the lower member being adapted to support said leg, said bracket having provision for receiving and securing a caster thereto.

8. In a caster bracket adapted to receive the lower end of an angle iron leg, the combination of a top member with an angular opening for receiving said leg, a bottom member for supporting the leg, and caster securing means, said lower member having an opening for receiving said securing means, which opening in vertical alignment is near the apex of the angular opening in the upper member, said upper member having a part of the wall of its angular opening near the apex adapted to be engaged by the upper end of the securing means to force the same against the angle iron leg to wedge the leg in the angular opening.

9. In a caster bracket adapted to receive the lower end of an angle iron leg, the combination of a top member with an angular opening for receiving the leg, and a bottom member for supporting the leg, said top and bottom members each having angularly disposed vertical flanges against which the outer surfaces of the angle iron leg are adapted to fit, and caster securing means, said lower member having an opening for receiving said securing means, which opening in vertical alignment is near the apex of the angular opening in the upper member, said upper member having a part of the wall of its angular opening near the apex adapted to be engaged by the upper end of the securing means to force the same against the angle iron leg to wedge the leg in the angular opening.

10. In a caster bracket adapted to receive the lower end of an angle iron leg, the combination of substantially triangular shaped top and bottom members, the hypothenuse of each member being joined by an upright member, and vertical angularly disposed strips paralleling the other two sides of each member and against which the angle iron leg is adapted to fit, the top member having a substantially angle iron shaped opening for receiving the leg, and having an enlargement at the inner side of the apex of said opening and a caster pintle socket having a tapering top portion, said lower member being adapted to support the leg and having an opening for receiving said socket, said last opening being in approximate vertical alignment with the enlargement of said opening in the top member, said tapering portion of the socket being adapted to engage the wall of the enlarged portion of the upper opening to wedge the angle iron against said vertical strips.

11. In a caster bracket adapted to receive the lower end of an angle iron leg, the combination of substantially parallel top and bottom horizontal members bent laterally from a connecting upright member, said top and bottom members being substantially of right-angle triangular form with the hypothenuse of each joining said upright member, and vertical flanges bent up from said horizontal members along the front angularly disposed edges thereof, the flanges of one member extending toward those of the other and approximately parallel, the upper member having an angularly shaped opening paralleling its flanges for receiving the angle iron leg, and the lower member being adapted to support the angle iron leg, said bracket having provision for receiving and securing a caster pintle thereto.

12. In a caster bracket adapted to receive the lower end of an angle iron leg, the combination of substantially parallel top and bottom horizontal members bent laterally from a connecting upright member, said top and bottom members being substantially of right angle triangular form with the hypothenuse of each joining said upright member, and vertical flanges bent up from said horizontal members along the front angularly disposed edges thereof, the flanges of one member extending toward those of the other and approximately parallel, the upper member having an angularly shaped opening paralleling its flanges for receiving the angle iron leg, and the lower member being adapted to support the angle iron leg, said upper and lower members having substantially aligned openings for receiving a caster pintle socket.

13. The method of forming a caster bracket which consists in forming an integral sheet metal blank having top and bottom tapered end portions with openings in said end portions, bending or drawing one of said end portions laterally with respect to the rest of the blank and bending or drawing the tapering edges of said portion laterally with respect to said portion so as to position said end portion at substantially right angles to the rest of the blank and provide flanges along the tapering edges of said portion at substantially right angles to said portion, then punching out a substantially angle iron shaped opening along the base of said flange, then bending or drawing up the tapering edges of the other end of the blank to form a lateral angular flange around the edge thereof, and then bending over said last end to bring said last flanges into approximate alignment with said first flanges on the other end of the blank.

In testimony whereof I have signed my name to this specification.

WALTER F. HEROLD.